United States Patent
Fang et al.

(10) Patent No.: US 12,494,526 B2
(45) Date of Patent: Dec. 9, 2025

(54) BATTERY CELL, BATTERY, ELECTRIC APPARATUS, AND MANUFACTURING METHOD AND DEVICE FOR BATTERY CELL

(71) Applicant: CONTEMPORARY AMPEREX TECHNOLOGY (HONG KONG) LIMITED, Hong Kong (CN)

(72) Inventors: Kun Fang, Fujian (CN); Zhijun Guo, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 377 days.

(21) Appl. No.: 18/223,064

(22) Filed: Jul. 18, 2023

(65) Prior Publication Data

US 2023/0361380 A1    Nov. 9, 2023

Related U.S. Application Data

(63) Continuation of application No. PCT/CN2021/125114, filed on Oct. 20, 2021.

(51) Int. Cl.
*H01M 10/653* (2014.01)
*H01M 10/0587* (2010.01)
(Continued)

(52) U.S. Cl.
CPC ..... *H01M 10/653* (2015.04); *H01M 10/0587* (2013.01); *H01M 50/102* (2021.01); *H01M 50/533* (2021.01); *H01M 2220/20* (2013.01)

(58) Field of Classification Search
CPC ............. H01M 50/533; H01M 50/538; H01M 50/593; H01M 50/595
See application file for complete search history.

(56) References Cited

U.S. PATENT DOCUMENTS

2005/0118499 A1    6/2005   Kim

FOREIGN PATENT DOCUMENTS

| CN | 2681364 Y | 2/2005 |
| CN | 206163531 U | 5/2017 |

(Continued)

OTHER PUBLICATIONS

JP-4649698 original and translation (Year: 2011).*

(Continued)

*Primary Examiner* — Brian R Ohara
*Assistant Examiner* — Brent C Thomas
(74) *Attorney, Agent, or Firm* — XSENSUS LLP

(57) ABSTRACT

This application provides a battery cell. The battery cell may include: a housing including a wall portion; an electrode terminal insulatively mounted on the wall portion; an electrode assembly disposed in the housing, where the electrode assembly may include a body and a first tab, and the first tab may be formed at an end of the body closer to the wall portion; a current collector disposed between the electrode assembly and the wall portion, where the current collector may be configured to connect the first tab and the electrode terminal; and a heat shrink film, where at least a part of the heat shrink film may cover a side of the current collector facing toward the wall portion to insulate the current collector from the wall portion.

12 Claims, 8 Drawing Sheets

(51) Int. Cl.
    *H01M 50/102*     (2021.01)
    *H01M 50/533*     (2021.01)

(56) References Cited

FOREIGN PATENT DOCUMENTS

| | | |
|---|---|---|
| CN | 206250305 U | 6/2017 |
| CN | 107644961 A | 1/2018 |
| CN | 209896150 U | 1/2020 |
| CN | 210640323 U | 5/2020 |
| CN | 211629211 U | 10/2020 |
| CN | 112909445 A | 6/2021 |
| CN | 113067070 A | 7/2021 |
| CN | 113346201 A | 9/2021 |
| EP | 4270630 A1 | 11/2023 |
| JP | 2001-229972 A | 8/2001 |
| JP | 2005-166664 A | 6/2005 |
| JP | 4649698 B2 * | 3/2011 |

OTHER PUBLICATIONS

Extended European Search Report issued Feb. 24, 2025 in European Patent Application No. 21960944.3.
Notice of Granting Utility Model Patent Right issued Dec. 16, 2022 in Chinese Patent Application No. 202122530793.6 with English translation thereof.
Notice of Reasons for Refusal issued Sep. 10, 2024 in Japanese Patent Application No. 2023-541758 with English translation thereof.
Decision to Grant a Patent issued Nov. 19, 2024 in Japanese Patent Application No. 2023-541758 with English translation thereof.
International Search Report and Written Opinion mailed on Jun. 23, 2022, received for PCT Application PCT/CN2021/125114, filed on Oct. 20, 2021, 8 pages including English Translation.

* cited by examiner

BATTERY CELL, BATTERY, ELECTRIC APPARATUS, AND MANUFACTURING METHOD AND DEVICE FOR BATTERY CELL

CROSS-REFERENCE TO RELATED APPLICATION

The present application is a continuation of International Application No. PCT/CN2021/125114, filed Oct. 20, 2021, which is incorporated herein by reference in its entirety.

TECHNICAL FIELD

This application relates to the field of battery technologies, and in particular, to a battery cell, a battery, an electric apparatus, and a manufacturing method and device for battery cell.

BACKGROUND

Energy saving and emission reduction are crucial to the sustainable development of the automobile industry. Electric vehicles, with their advantages in energy conservation and environmental protection, have become an important part of the sustainable development of the automobile industry. For electric vehicles, battery technology is an important factor in connection with their development.

During charging and discharging of batteries, battery cells have the risk of short circuits, posing a great safety hazard. How the probability of short circuits of battery cells is reduced to improve the safety of battery cells and batteries is essential to the development of the battery technologies.

SUMMARY

This application is intended to provide a battery cell, a battery, an electric apparatus, and a manufacturing method and device for battery cell. The battery cell is not prone to short circuits and therefore has high safety.

According to a first aspect, this application provides a battery cell including: a housing including a wall portion; an electrode terminal insulatively mounted on the wall portion; an electrode assembly disposed in the housing, where the electrode assembly includes a body and a first tab, and the first tab is formed at an end of the body closer to the wall portion; a current collecting member or collector disposed between the electrode assembly and the wall portion, where the current collecting member is configured to connect the first tab and the electrode terminal; and a heat shrink film, where at least a part of the heat shrink film covers a side of the current collecting member facing toward the wall portion to insulate the current collecting member from the wall portion.

In the battery cell of this application, the heat shrink film covers the current collecting member by heat shrinkage to insulate the current collecting member from the wall portion. The heat shrink film has so good covering performance after heat shrinkage that when the battery cell is affected by an external factor, the heat shrink film can still firmly cover the current collecting member, thereby reducing the risk of short circuits between the current collecting member and the wall portion and improving the safety of battery cells. In addition, the surface of the heat shrink film formed by heat shrinkage is flat and unlikely to wrinkle, and the heat shrink film has a uniform thickness. This reduces the probability that wrinkling increases the thickness of the heat shrink film, thus preventing an excessively thick heat shrink film from interfering with the current collecting member while such interference increases obstruction and difficulty in placing the electrode assembly into the housing, and therefore improves the production efficiency of battery cells.

In some embodiments of this application, the heat shrink film extends between the electrode terminal and the current collecting member.

In the foregoing solution, since the heat shrink film needs to completely cover the current collecting member, with the heat shrink film extending between the electrode terminal and the current collecting member, the range of the heat shrink film covering the current collecting member does not need to be adjusted, reducing the process difficulty of covering the current collecting member with the heat shrink film and improving the production efficiency of battery cells. In addition, with the heat shrink film extending between the electrode terminal and the current collecting member, the heat shrink film is sandwiched by the electrode terminal and the current collecting member to prevent shrinkage of the heat shrink film under heat, swelling of the electrode assembly, and the like from causing incomplete coverage of the current collecting member by the heat shrink film, thereby improving the stability of the heat shrink film in covering the current collecting member to ensure that the heat shrink film can stably insulate the current collecting member from the wall portion, and improving the safety of battery cells.

In some embodiments of this application, a gap is present between the heat shrink film and the wall portion.

In the foregoing solution, a gap is made between the heat shrink film and the wall portion to reduce the risk that a potential difference between the wall portion and the current collecting member breaks through the heat shrink film, that is, reduce the risk of short circuits of the battery cell, thereby improving the safety of the battery cell.

In some embodiments of this application, the heat shrink film includes a first portion and a second portion that are integrally formed, the first portion covers the side of the current collecting member facing toward the wall portion, and the second portion covers an outer peripheral surface of the first tab.

In the foregoing solution, the heat shrink film not only covers the current collecting member but also covers the outer peripheral surface of the first tab, so that one insulation film insulates and separates the current collecting member from the wall portion and the first tab from a side wall of the housing, reducing the number of parts and making the battery cell structurally compact.

In some embodiments of this application, the current collecting member is disk-shaped, diameter of the current collecting member being smaller than diameter of the first tab, a step zone is formed between an edge of the current collecting member and the outer peripheral surface of the first tab, and the heat shrink film covers the step zone.

In the foregoing solution, disposing the step zone provides sufficient space for welding the current collecting member to the first tab so as to facilitate welding of the current collecting member to the first tab, thereby improving the production efficiency of battery cells and increasing the production capacity of batteries. In addition, during the heat shrinkage of the heat shrink film, the step zone can offset a surplus of the heat shrink film, thereby reducing the probability of wrinkling during the shrinkage of the heat shrink film and improving the flatness of the heat shrink film covering the current collecting member.

In some embodiments of this application, the heat shrink film further includes a third portion, the third portion covering an outer peripheral surface of the body, and the third portion and the second portion being integrally formed.

In the foregoing solution, the third portion covers the outer peripheral surface of the body, reducing the risk of short circuits between the housing and the body, and therefore reducing the risk of short circuits of battery cells and improving the safety of battery cells. In addition, the third portion and the second portion are integrally formed and therefore the third portion and the second portion are unlikely to overlap with each other, preventing overlap of the second portion and the third portion from increasing the thickness of the heat shrink film, and reducing the probability of local stress concentration caused by the thicker heat shrink film pressing against the housing, thereby reducing the risk of lithium precipitation of electrode plates caused by stress concentration.

In some embodiments of this application, the electrode assembly is formed by winding electrode plates and a separator, and the battery cell further includes an adhesive tape, the adhesive tape adhering to the outer peripheral surface of the body and securing a winding tail end of the electrode plate and/or the separator, and the third portion not overlapping with the adhesive tape.

In the foregoing solution, no overlapping of the third portion and the adhesive tape prevents a thicker overlap part resulting from overlapping of the third portion and the adhesive tape and therefore makes local stress concentration unlikely, where the local stress concentration is caused by the thicker part pressing against the side wall of the housing, thereby reducing the risk of lithium precipitation of electrode plates caused by stress concentration.

In some embodiments of this application, the battery cell further includes an elastic layer, the elastic layer being disposed between the wall portion and the heat shrink film, and the elastic layer being configured to apply an elastic force to the electrode assembly along an axial direction of the electrode assembly.

In the foregoing solution, when the battery cell is subjected to vibration, the elastic layer can apply an elastic force to the electrode assembly and the current collecting member along the axial direction thereof, further insulating and separating the current collecting member from the wall portion, reducing the risk of short circuits of battery cells, and improving the safety of battery cells.

In some embodiments of this application, the electrode assembly further includes a second tab, the second tab being formed at an end of the body farther away from the wall portion, the second tab and the first tab having opposite polarities, and the second tab being electrically connected to the wall portion.

In the foregoing solution, the first tab and the second tab are located at two ends of the electrode assembly, allowing desirable insulation between the first tab and the second tab, thereby reducing the risk of short circuits of battery cells and improving the safety of battery cells.

In some embodiments of this application, the housing includes a housing body and an end cover, the housing body including a bottom wall and a side wall, the side wall surrounding the bottom wall, one end of the side wall being connected to the bottom wall, the other end of the side wall enclosing an opening opposite the bottom wall, the end cover covering the opening, and the wall portion being the bottom wall or the end cover.

In the foregoing solution, the second wall and the wall portion define a space to accommodate the electrode assembly, electrolyte, and other structures, and the opening enclosed by the second wall is covered by the end cover to prevent electrolyte from leaking through the opening.

According to a second aspect, this application provides a battery including the foregoing battery cell.

According to a third aspect, this application provides an electric apparatus including the foregoing battery, where the battery is configured to supply electrical energy.

According to a fourth aspect, this application provides a manufacturing method for battery cell including: providing a housing and an electrode terminal, where the housing includes a wall portion, and the electrode terminal is insulatively mounted on the wall portion; providing an electrode assembly, where the electrode assembly includes a body and a first tab, and the first tab is formed at an end of the body closer to the wall portion; providing a current collecting member in a way that the current collecting member is connected to the first tab; providing a heat shrink film in a way that the heat shrink film is fitted onto the electrode assembly; heating the heat shrink film to shrink so that at least a part of the heat shrink film covers the current collecting member; placing the electrode assembly and the current collecting member with the heat shrink film into the housing, with a side of the current collecting member covered with the heat shrink film facing toward the wall portion to insulate the current collecting member from the wall portion; and connecting the current collecting member to the electrode terminal.

According to a fifth aspect, this application provides a manufacturing device for battery cell including: a first providing means configured to provide a housing and an electrode terminal, where the housing includes a wall portion, and the electrode terminal is insulatively mounted on the wall portion; a second providing means configured to provide an electrode assembly, where the electrode assembly includes a body and a first tab, and the first tab is formed at an end of the body closer to the wall portion; a third providing means configured to provide a current collecting member; a fourth providing means configured to provide a heat shrink film in a way that the heat shrink film is fitted onto the electrode assembly; a first assembly means configured to connect the current collecting member to the first tab; a heating means configured to heat the heat shrink film to shrink so that at least a part of the heat shrink film covers the current collecting member; a second assembly means configured to place the electrode assembly and the current collecting member covered with the heat shrink film into the housing, with a side of the current collecting member covered with the heat shrink film facing toward the wall portion to insulate the current collecting member from the wall portion; and a third assembly means configured to connect the current collecting member to the electrode terminal.

BRIEF DESCRIPTION OF DRAWINGS

To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

Figure 1:
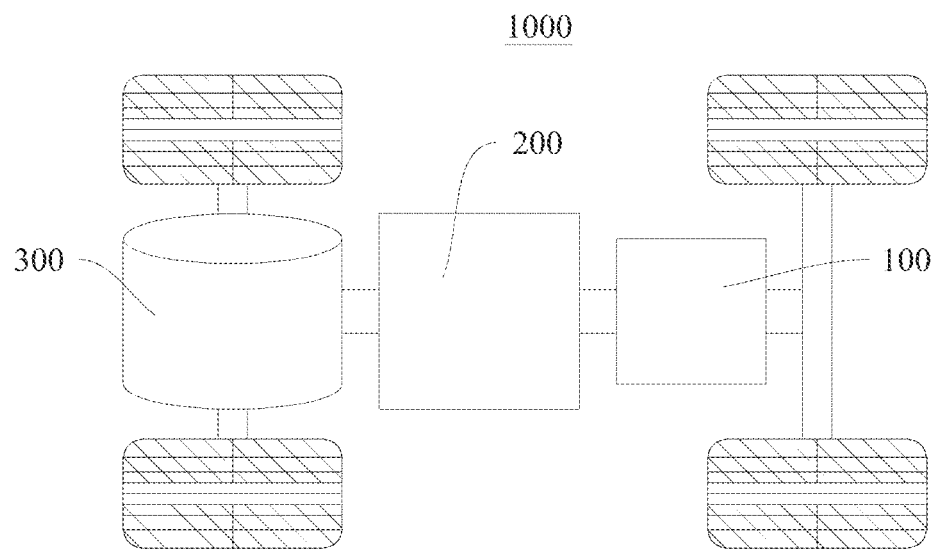
FIG. 1 is a schematic structural diagram of a vehicle according to an embodiment of this application.

The accompanying drawings are not drawn to scale.

Description of reference signs: 10. battery cell; 11. housing; 11a. wall portion; 111. housing body; 1111. bottom wall; 1112. side wall; 112. end cover; 12. electrode terminal; 121. insulation member; 1211. elastic layer; 122. second protruding portion; 13. electrode assembly; 131. first tab; 132. body; 133. second tab; 14. current collecting member; 141. first protruding portion; 142. step zone; 15. heat shrink film; 151. first portion; 152. second portion; 153. third portion; 20. box; 21. first sub-box; 22. second sub-box; 100. battery; 200. controller; 300. motor; 1000. vehicle; 2000. manufacturing device for battery cell; 2100. first providing means; 2200. second providing means; 2300. third providing means; 2400. fourth providing means; 2500. first assembly means; 2600. heating means; 2700. second assembly means; and 2800. third assembly means.

DESCRIPTION OF EMBODIMENTS

The following further describes the implementations of this application in detail with reference to the accompanying drawings and embodiments. The detailed description of embodiments and the accompanying drawings are intended to illustrate the principle of this application, rather than to limit the scope of this application, meaning this application is not limited to the embodiments described herein.

In the description of this application, it should be noted that, unless otherwise stated, "a plurality of" means at least two; and the orientations or positional relationships indicated by the terms "upper", "lower", "left", "right", "inside", "outside", and the like are merely for ease and brevity of description of this application rather than indicating or implying that the means or components mentioned must have specific orientations or must be constructed or manipulated according to particular orientations. These terms shall therefore not be construed as limitations on this application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The orientation terms appearing in the following description all are directions shown in the figures, and do not limit the specific structure of this application. In the description of this application, it should also be noted that unless otherwise specified and defined explicitly, the terms "mount", "connect", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

The battery mentioned in this application is a single physical module that includes one or more battery cells for providing a higher voltage and capacity. For example, the battery mentioned in this application may include a battery module, a battery pack, or the like.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. The part of positive electrode current collector uncoated with the positive electrode active substance layer protrudes out of the part of positive electrode current collector coated with the positive electrode active substance layer and serves as a positive tab. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. The part of negative electrode current collector uncoated with the negative electrode active substance layer protrudes out of the part of negative electrode current collector coated with the negative electrode active substance layer and serves as a negative tab. The negative electrode current collector may be made of copper, and the negative electrode active substance may be carbon, silicon, or the like. To allow a large current to pass through without any fusing, multiple positive tabs are provided and stacked together, and multiple negative tabs are provided and stacked together. The separator may be made of PP (Polypropylene, polypropylene), PE (Polyethylene, polyethylene), or the like.

Currently, from a perspective of the market development, application of traction batteries is being more extensive. Traction batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace. With continuous expansion of application fields of traction batteries, market demands for the traction batteries are also expanding.

The inventors have noted that batteries are likely to be affected by external factors such as vibration and collision during use. An electric apparatus equipped with battery cells and batteries being an electric vehicle is used as an example. During the driving of the electric vehicle, the electric vehicle is subjected to different degrees of bumping and vibration depending on road roughness. When the electric vehicle passes through deep pits, cracks, bumps, and other road defects, the body of the electric vehicle shifts sharply to cause the electric vehicle to vibrate intensely. In addition, when the electric vehicle experiences a collision, the battery cells are significantly disturbed regardless of a low-speed collision or a high-speed collision. When the battery cell is subjected to vibration, an electrode assembly and a current collecting member located in a housing of the battery cell may move, and especially in an axial direction of the electrode assembly, the current collecting member and the electrode assembly are prone to displacement. Further, due to the different polarities of the current collecting member and the housing, after the current collecting member and the electrode assembly move, there is a risk of short circuits between the current collecting member and the housing. A short circuit of the battery releases electrical energy stored in the battery cell in a form of thermal energy in a short time, causing thermal runaway, reducing the safety of battery cells, and posing a great safety hazard.

To reduce the risk of short circuits between the current collecting member and the housing and improve the safety of battery cells, the inventors have found through research that an insulation paper or insulation tube may be disposed between the current collecting member and the housing to insulate the current collecting member from the housing. However, the insulation paper covers the current collecting member through fitting, and consequently, the insulation paper itself easily peels off and therefore is unable to cover the current collecting member effectively when disturbed by vibration. In addition, the insulation tube is fitted onto the electrode assembly and covers the current collecting member by folding, and during the folding, the insulation tube wrinkles and therefore gets thicker at the folded part of the insulation tube. The thickening of the insulation tube covering the current collecting member reduces the stability of electrical connection between the current collecting member and the electrode terminal. In addition, the insulation tube being too thick increases obstruction and difficulty in placing the electrode assembly into the housing, reduces the production efficiency of battery cells, and thus leads to the low production capacity of batteries, failing to meet the increasing demand of the market for batteries.

In view of the above considerations, to reduce the risk of short circuits between the current collecting member and the housing, the inventors have designed through in-depth study a battery cell, in which a housing includes a wall portion (located on one end of the housing), and a side of a current collecting member facing toward the wall portion is covered with a heat shrink film to insulate the current collecting member from the wall portion. The heat shrink film covers the current collecting member through heat shrinkage, and the heat shrink film has better covering performance after heat shrinkage. In addition, after heat shrinkage, the heat shrink film can be flat and firmly cover the current collecting member, and therefore is unlikely to wrinkle.

In such a battery cell, after heat shrinkage, the heat shrink film is flat and firmly covers the current collecting member, and even if the battery cell is disturbed by external factors to cause the current collecting member to move, the heat shrink film can still firmly cover the current collecting member and insulate the current collecting member from the wall portion, reducing the risk of short circuits between the current collecting member and the wall portion and improving the safety of battery cells.

The battery cell disclosed in the embodiments of this application may be used without limitation in an electric apparatus such as a vehicle, a ship, or an aircraft. The battery cell, the battery, and the like disclosed in this application may be used to form a power supply system for such an electric apparatus. This helps to reduce the risk of short circuits between the current collecting member and the wall portion in the battery cell, thereby improving the safety of battery cells and batteries.

An embodiment of this application provides an electric apparatus that uses a battery as a power source. The electric apparatus may be but is not limited to a mobile phone, a tablet, a laptop computer, an electric toy, an electric tool, an electric bicycle, an electric car, a ship, or a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

For ease of description, the electric apparatus of an embodiment of this application being a vehicle is used as an example for description of the following embodiments.

As shown in FIG. 1, FIG. 1 is a schematic structural diagram of a vehicle 1000 according to some embodiments of this application. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. The vehicle 1000 is provided with a battery 100 inside, and the battery 100 may be disposed at the bottom, front, or rear of the vehicle 1000. The battery 100 may be configured to supply power to the vehicle 1000. For example, the battery 100 may be used as an operational power source for the vehicle 1000. The vehicle 1000 may further include a controller 200 and a motor 300, where the controller 200 is configured to control the battery 100 to supply power to the motor 300, for example, to satisfy power needs of start, navigation, and driving of the vehicle 1000.

In some embodiments of this application, the battery 100 can be used as not only the operational power source for the vehicle 1000 but also a driving power source for the vehicle 1000, replacing or partially replacing fossil fuel or natural gas to provide driving traction for the vehicle 1000.

Figure 2:
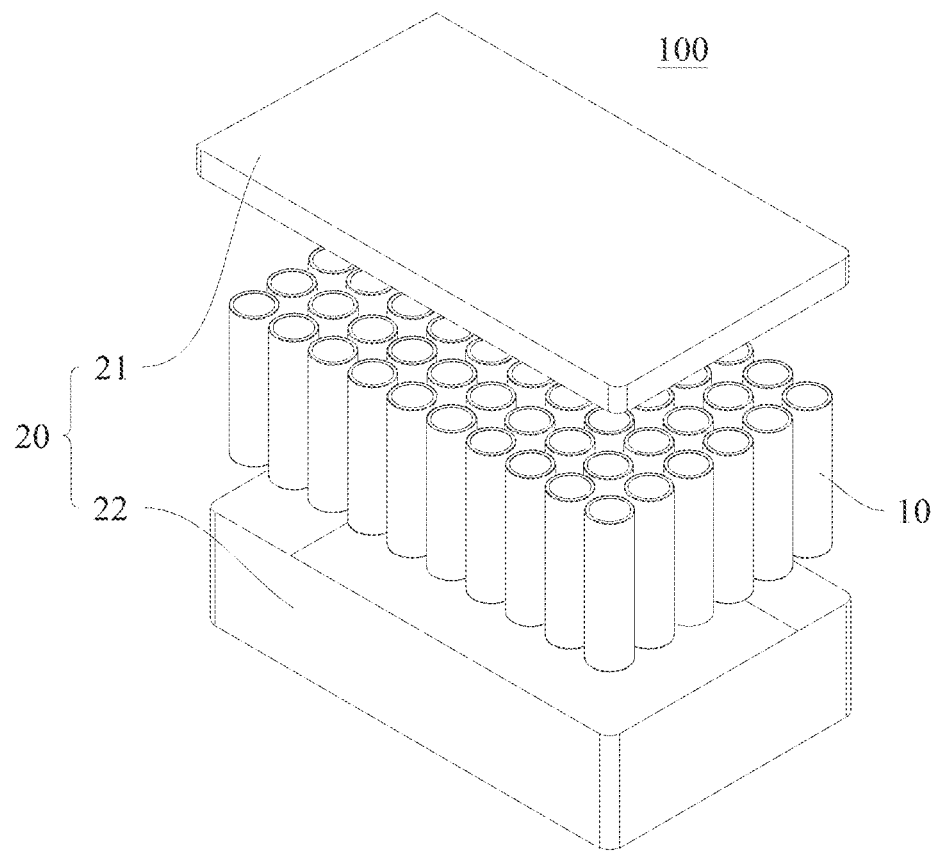
FIG. 2 is a schematic structural diagram of a battery according to an embodiment of this application.

As shown in FIG. 2, FIG. 2 is a schematic structural diagram of a battery 100 according to some embodiments of this application. The battery 100 includes a box and a battery cell 10, where the battery cell 10 is accommodated in the box 20. The box 20 is configured to provide an accommodating space for the battery cell 10. The box 20 may be a variety of structures. In some embodiments, the box 20 may include a first sub-box 21 and a second sub-box 22. The first sub-box 21 and the second sub-box 22 fit together and jointly define an accommodating space for accommodating the battery cell 10. The second sub-box 22 may be a hollow structure with one end open, the first sub-box 21 may be a plate structure, and the first sub-box 21 covers an open side of the second sub-box 22, so that the first sub-box 21 and the second sub-box 22 jointly define an accommodating space. The first sub-box 21 and the second sub-box 22 may both be a hollow structure with one side open, and the open side of the first sub-box 21 covers the open side of the second sub-box 22.

Certainly, the box 20 formed by the first sub-box 21 and the second sub-box 22 may be a variety of shapes, for example, a cylinder or a cuboid.

In the battery 100, the battery cell 10 may be present in plurality, and the plurality of battery cells 10 may be connected in series, parallel, or series-parallel, where being connected in series-parallel means a combination of series and parallel connections of the plurality of battery cells 10. The plurality of battery cells 10 may be directly connected in series, parallel, or series-parallel, and then an entirety of the plurality of battery cells 10 is accommodated in the box 20; or certainly, the battery 100 may be formed by a plurality of battery cells 10 being connected in series, parallel, or series-parallel first to form a battery module and then a plurality of battery modules being connected in series, parallel, or series-parallel to form an entirety which is accommodated in the box 20. The battery 100 may further include other structures. For example, the battery 100 may further include a busbar configured to implement electrical connection between the plurality of battery cells 10.

Each battery cell 10 may be a secondary battery or a primary battery, and may be a lithium-sulfur battery, a sodium-ion battery, or a magnesium-ion battery, without being limited thereto. The battery cell 10 may be cylindrical, flat, cuboid, or of other shapes.

Figure 3:
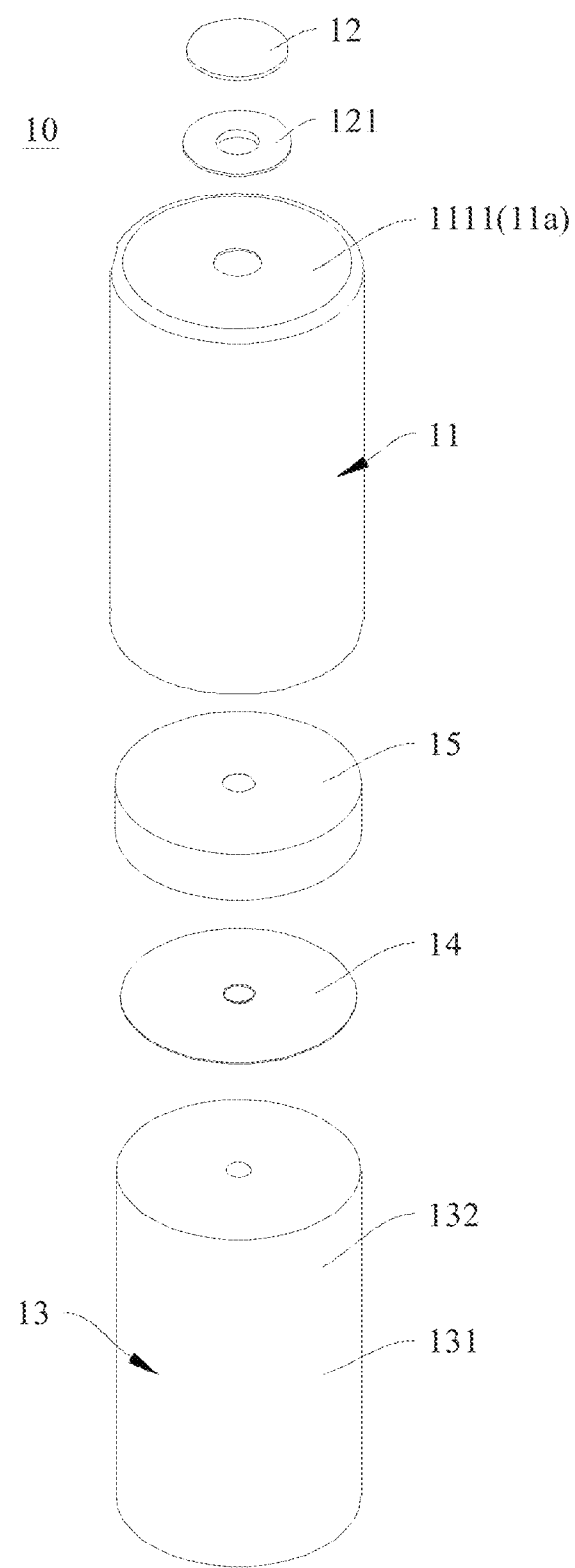
FIG. 3 is an exploded view of a battery cell according to an embodiment of this application.

As shown in FIG. 3, FIG. 3 is an exploded view of a battery cell 10 according to some embodiments of this application. The battery cell 10 refers to a smallest element constituting the battery 100. As shown in FIG. 3, the battery cell 10 includes a housing 11, an electrode assembly 13, and other functional components.

The housing 11 is an assembly configured to form an internal environment of the battery cell 10, where the internal environment formed by the housing 11 may be configured to accommodate the electrode assembly 13, an electrolyte, and other components. The housing 11 may be of various shapes and sizes, such as a cylindrical shape, a cuboid shape, and a hexagonal prism shape. Specifically, a shape of the housing 11 may be determined according to a specific shape and size of the electrode assembly 13. The housing 11 may be made of various materials, such as copper, iron, aluminum, stainless steel, and aluminum alloy.

The electrode assembly 13 is a component in which electrochemical reactions occur in the battery cell 10. The housing 11 may include one or more electrode assemblies 13. The electrode assembly 13 is mainly formed by winding or stacking a positive electrode plate and a negative electrode plate, and a separator is generally provided between the positive electrode plate and the negative electrode plate. Parts of the positive electrode plate and the negative electrode plate with active substances constitute a body 132 of the electrode assembly 13, while parts of the positive electrode plate and the negative electrode plate without active substances each constitute a tab. A positive tab and a negative tab may both be located at one end of the body 132 portion or be located at two ends of the body 132 portion respectively. During charging and discharging of the battery 100, a positive electrode active substance and a negative electrode active substance react with an electrolyte, and the tabs are connected to the electrode terminals 12 to form a current loop.

Figure 4:
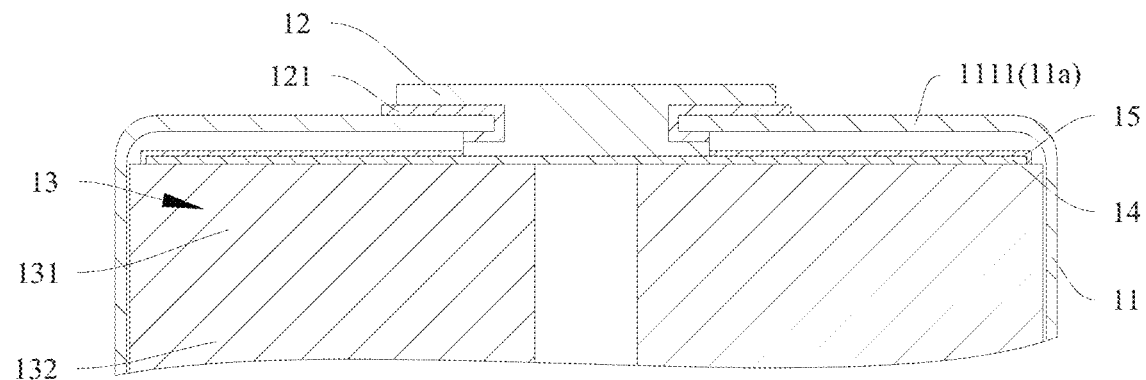
FIG. 4 is a cross-sectional view of a battery cell according to an embodiment of this application.

As shown in FIG. 4, FIG. 4 is a cross-sectional view of a battery cell 10 according to some embodiments of this application. This application provides a battery cell 10. The battery cell 10 includes a housing 11, an electrode terminal 12, an electrode assembly 13, a current collecting member 14, and a heat shrink film 15. The housing 11 includes a wall portion 11a, and the electrode terminal 12 is insulatively mounted on the wall portion 11a. The electrode assembly 13 is disposed in the housing 11, where the electrode assembly 13 includes a body 132 and a first tab 131, and the first tab 131 is formed at an end of the body 132 closer to the wall portion 11a. The current collecting member 14 is disposed between the electrode assembly 13 and the wall portion 11a, where the current collecting member 14 is configured to connect the first tab 131 and the electrode terminal 12. At least a part of the heat shrink film 15 covers a side of the current collecting member 14 facing toward the wall portion 11a to insulate the current collecting member 14 from the wall portion 11a.

With the electrode terminal 12 insulatively mounted on the wall portion 11a, since the electrode terminal 12 and the housing 11 have different polarities, that is, the electrode terminal 12 and the wall portion 11a have different polarities (for example, in some embodiments of this application, the electrode terminal 12 is positively charged and the wall portion 11a is negatively charged), the electrode terminal 12 and the wall portion 11a should be insulated from each other to prevent the electrode terminal 12 from being electrically connected to the wall portion 11a while such connection causes a short circuit in the battery cell 10, thereby ensuring the high safety of battery cells 10, batteries 100, and electric apparatuses.

Specifically, as shown in FIG. 4, an insulation member 121 may be provided between the electrode terminal 12 and the wall portion 11a. The insulation member 121 is configured to separate the electrode terminal 12 from the wall portion 11a to reduce the risk of short circuits. The insulation member 121 may be made of plastic such as PVC (Polyvinyl Chloride, polyvinyl chloride) or PP (Polypropylene, polypropylene), the insulation member 121 may be made of rubber such as butyl rubber, styrene-butadiene rubber, or silicone rubber, or the insulation member 121 may be made of fiber material such as Nomex (aromatic polyamide/Nomex) insulation paper. The Nomex insulation paper is mainly made of meta-polyaramide fibers and therefore has good insulation performance and good heat and corrosion resistance.

That the current collecting member 14 is configured to connect the first tab 131 and the electrode terminal 12 means that both the first tab 131 and the electrode terminal 12 are connected to the current collecting member 14 and that the electrical connection between the first tab 131 and the electrode terminal 12 is implemented by the current collecting member 14.

The heat shrink film 15 is made of a heat shrink material which is a shape memory polymer material, a material obtained by radiation of a polymer material. A common polymer material such as polyethylene and polyvinyl chloride is generally a linear structure, and the linear-structured polymer material is transformed into a mesh-structured one under the action of radiation from a radiation source such as an electron accelerator. This type of mesh polymer material obtained through radiation is a heat shrink material. Heat shrink materials have a unique shape memory effect, and heat shrink materials gone through expansion, cooling, and shaping can shrink back to the initial shape after heating. By virtue of the shape memory effect of heat shrink materials, heat shrink materials can be made into heat shrink tubes, heat shrink films, special shaped heat shrink materials, and the like. During use, the heat shrink material is heated to make it shrink, and the heat shrink material shrunken forms the heat shrink film 15. The heat shrink film 15 is flat and firmly covers an outer surface of an object to provide insulation, sealing, protection, and the like for the object.

Further, that at least a part of the heat shrink film 15 covers a side of the current collecting member 14 facing toward the wall portion 11a means disposing a heat shrink material in a form of tube or film on the current collecting member 14, and heating the heat shrink material to make it shrink so as to form the heat shrink film 15. The heat shrink film 15 is flat and firmly covers the side of the current collecting member 14 facing toward the wall portion 11a to insulate the current collecting member 14 from the wall portion 11a.

It should be noted that as shown in FIG. 4, the heat shrink film 15 covering the side of the current collecting member 14 facing toward the wall portion 11a does not mean that the heat shrink film 15 completely covers the side of the current collecting member 14 facing toward the wall portion 11a. If the heat shrink film 15 completely covers the side of the current collecting member 14 facing toward the wall portion 11a, the heat shrink film 15 insulates and separates the electrode terminal 12 from the current collecting member 14, but the electrode terminal 12 and the current collecting member 14 need to be electrically connected, in other words, the electrode terminal 12 and the current collecting member 14 should have parts abut against and come into contact with each other. Specifically, it is sufficient for the heat shrink film 15 to cover a part of the current collecting member 14 corresponding to the wall portion 11a.

In addition, as shown in FIG. 4, a part of the electrode terminal 12 is located between the wall portion 11a and the current collecting member 14, in other words, a projection of the wall portion 11a on the current collecting member 14 overlaps with a projection of the part of the electrode terminal 12 located between the wall portion 11a and the current collecting member 14 on the current collecting member 14. Since the electrode terminal 12 and the current collecting member 14 need to be electrically connected rather than insulated from each other, the heat shrink film 15 does not need to cover a part of the current collecting member 14 within which a projection of a partial electrode terminal 12 between the wall portion 11a and the current collecting member 14 and on the current collecting member 14 is located, (this part is located within a projection of the wall portion 11a on the current collecting member 14). It can be understood that the heat shrink film 15 may cover the side of the current collecting member 14 facing toward the wall portion 11a in any manner, provided that the heat shrink film 15 insulates and separates the current collecting member 14 from the wall portion 11a and ensures a stable electrical connection between the current collecting member 14 and the electrode terminal 12.

In the battery cell 10 of this application, the heat shrink film 15 covers the current collecting member 14 by heat shrinkage to insulate the current collecting member 14 from the wall portion 11a. The heat shrink film 15 has so good covering performance after heat shrinkage that when the battery cell 10 is affected by an external factor and external disturbance the heat shrink film 15 can still firmly cover the current collecting member 14, thereby reducing the risk of short circuits between the current collecting member 14 and the wall portion 11a and improving the safety of battery cells 10. In addition, the surface of the heat shrink film 15 formed by heat shrinkage is flat and unlikely to wrinkle, and the heat shrink film 15 has a uniform thickness. This reduces the probability that wrinkling increases the thickness of the heat shrink film 15, thus preventing an excessively thick heat shrink film 15 from interfering with the current collecting member 14 while such interference increases obstruction and difficulty in placing the electrode assembly 13 into the housing, and therefore improves the production efficiency of battery cells 10.

Figure 5:
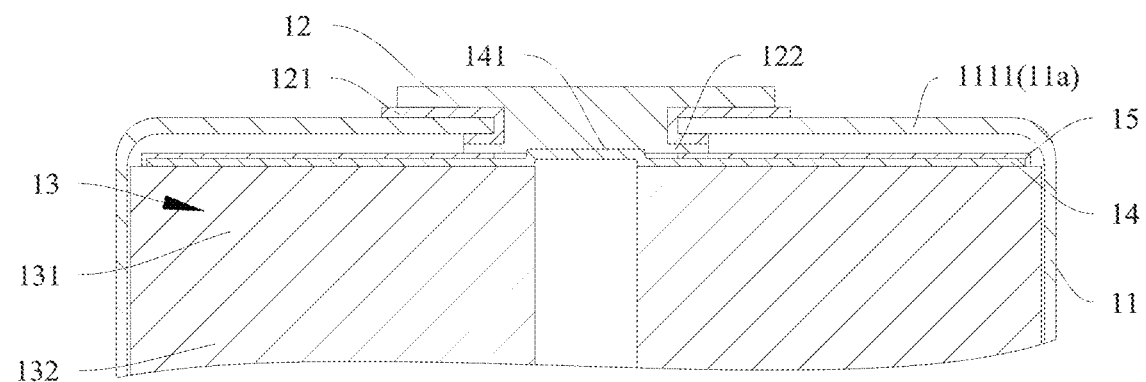
FIG. 5 is a schematic diagram of a heat shrink film extending between an electrode terminal and a current collecting member according to an embodiment of this application.

As shown in FIG. 5, FIG. 5 is a schematic diagram of a heat shrink film 15 extending between an electrode terminal 12 and a current collecting member 14 according to some embodiments of this application. In some embodiments of this application, the heat shrink film 15 extends between the electrode terminal 12 and the current collecting member 14.

First, a part of the heat shrink film 15 extends between the electrode terminal 12 and the current collecting member 14 so that the heat shrink film 15 is clamped and compressed by the electrode terminal 12 and the current collecting member 14 to prevent the heat shrink film 15 from moving and thus incompletely covering the part of the current collecting member 14 corresponding to the wall portion 11a, thereby reducing the risk of short circuits between the current collecting member 14 and the wall portion 11a and guaranteeing the high safety of battery cells 10. In addition, since the heat shrink film 15 needs to completely cover the current collecting member 14, extending the heat shrink film 15 between the electrode terminal 12 and the current collecting member 14 can reduce the precision requirement of wrapping the heat shrink film 15 and therefore reduce the process difficulty of covering the current collecting member 14 with the heat shrink film 15.

Second, because the battery cell 10 generates heat during use, the temperature of the battery cell 10 rises. As a result, not only the heat shrink film 15 is heated to cause the heat shrink film 15 to shrink further, but also the electrode assembly 13 swells outward, and therefore the heat shrink film 15 cannot completely cover the current collecting member 14, and cannot insulate the current collecting member 14 from the wall portion 11a either, posing the risk of short circuits between the current collecting member 14 and the wall portion 11a. Therefore, with the arrangement that the heat shrink film 15 extends between the electrode terminal 12 and the current collecting member 14, even if the temperature of the battery cell 10 rises to cause the heat shrink film 15 to shrink further, the part of the heat shrink film 15 covering the current collecting member 14 does not shift due to shrinkage because the electrode terminal 12 and the current collecting member 14 clamp and press against the heat shrink film 15, in other words, the heat shrink film 15 can firmly cover the part of the current collecting member 14 corresponding to the wall portion 11a, thereby ensuring that the current collecting member 14 and the wall portion 11a are insulated from each other, reducing the risk of short circuits between the current collecting member 14 and the wall portion 11a, and ensuring the high safety of battery cells 10.

In some other embodiments of this application, the heat shrink film 15 may alternatively not extend between the electrode terminal 12 and the current collecting member 14, in other words, a projection of a part of the electrode terminal 12 located between the current collecting member 14 and the wall portion 11a on the current collecting member 14 does not overlap with a projection of the heat shrink film 15 on the current collecting member 14.

Further, when the heat shrink film 15 extends between the electrode terminal 12 and the current collecting member 14, a gap is present between the electrode terminal 12 and the current collecting member 14 because the heat shrink film 15 has a certain thickness. The electrode terminal 12 and the current collecting member 14 should be in contact with each other and have a stable electrical connection to ensure that the battery cell 10 forms a stable loop and thus ensure that the battery cell 10 can stably supply power. The gap between the electrode terminal 12 and the current collecting member 14 destroys the stability of the electrical connection between the electrode terminal 12 and the current collecting member 14 and even makes it impossible for the battery cell to form a loop to supply power.

Therefore, as shown in FIG. 5, in some embodiments of this application, to ensure a stable electrical connection between the current collecting member 14 and the electrode terminal 12, a part of the current collecting member 14 for connecting to the electrode terminal 12 may protrude toward the electrode terminal 12 to form a first protruding portion 141 so that the current collecting member 14 and the electrode terminal 12 can remain in contact with each other and have a stable electrical connection.

Further, as shown in FIG. 5, when the current collecting member 14 is formed with the first protruding portion 141, to ensure that the electrode terminal 12 and the current collecting member 14 can clamp the heat shrink film 15 when the heat shrink film 15 extends between the electrode terminal 12 and the current collecting member 14, a part of the electrode terminal 12 for clamping the heat shrink film 15 together with the current collecting member 14 may be formed with a second protruding portion 122 extending toward the current collecting member 14. The first protruding portion 141 and the second protruding portion 122 are disposed to ensure that the electrode terminal 12 can clamp the heat shrink film 15 extending between the electrode terminal 12 and the current collecting member 14 through the second protruding portion 122 together with the current collecting member 14 while ensuring that the current collecting member 14 is stably electrically connected to the electrode terminal 12 through the first protruding portion 141.

In such arrangement that the heat shrink film 15 extends between the electrode terminal 12 and the current collecting member 14, the range of the heat shrink film 15 covering the current collecting member 14 does not need to be adjusted, reducing the process difficulty of covering the current collecting member 14 with the heat shrink film 15 and improving the production efficiency of battery cells 10. In addition, with the heat shrink film 15 extending between the electrode terminal 12 and the current collecting member 14, the heat shrink film 15 is sandwiched by the electrode terminal 12 and the current collecting member 14 to prevent shrinkage of the heat shrink film 15 under heat, swelling of the electrode assembly 13, and the like from causing incomplete coverage of the current collecting member 14 by the heat shrink film 15, thereby improving the stability of the heat shrink film 15 in covering the current collecting member 14 and improving the safety of battery cells 10.

As shown in FIGS. 4 and 5, in some embodiments of this application, a gap is present between the heat shrink film 15 and the wall portion 11a, in other words, the heat shrink film 15 is not in contact with the wall portion 11a.

The heat shrink film 15 covering the side of the current collecting member 14 facing toward the wall portion 11a can be understood as the heat shrink film 15 tightly adhering to an outer surface of the current collecting member 14 facing toward the wall portion 11a. Further, the current collecting member 14 and the wall portion 11a have different polarities, and therefore an electrical potential difference is present between the current collecting member 14 and the wall portion 11a. Although the heat shrink film 15 itself has good insulation to insulate the current collecting member 14 from the wall portion 11a, because the heat shrink film 15 is thin, when the heat shrink film 15 is in contact with the wall portion 11a, there is a risk that the electrical potential difference between the current collecting member 14 and the wall portion 11a breaks through the heat shrink film 15. Therefore, a specific gap should be present between the heat shrink film 15 and the wall portion 11a to prevent break-through of the heat shrink film 15 caused by the current collecting member 14 being too close to the wall portion 11a while such break-through results in communication between the current collecting member 14 and the wall portion 11a and thus a short circuit.

In some other embodiments of this application, when the heat shrink film 15 is thick, a potential difference between the current collecting member 14 and the wall portion 11a is not sufficient to break through the heat shrink film 15. In this case, a gap may alternatively not be provided between the heat shrink film 15 and the wall portion 11a, in other words, the heat shrink film 15 may alternatively abut against the wall portion 11a. It can be understood that the heat shrink film 15 may be set in a way that the current collecting member 14 is insulated from the wall portion 11a.

In such arrangement, since there is a certain potential difference between the wall portion 11a and the current collecting member 14, if the heat shrink film 15 is in contact with the wall portion 11a, there is a risk that the potential difference between the wall portion 11a and the current collecting member 14 breaks through the heat shrink film 15. Therefore, the gap is left between the heat shrink film 15 and the wall portion 11a to reduce the risk of short circuits between the wall portion 11a and the current collecting member 14, namely, reduce the risk of short circuits of battery cells 10, and improve the safety of battery cells 10.

Figure 6:
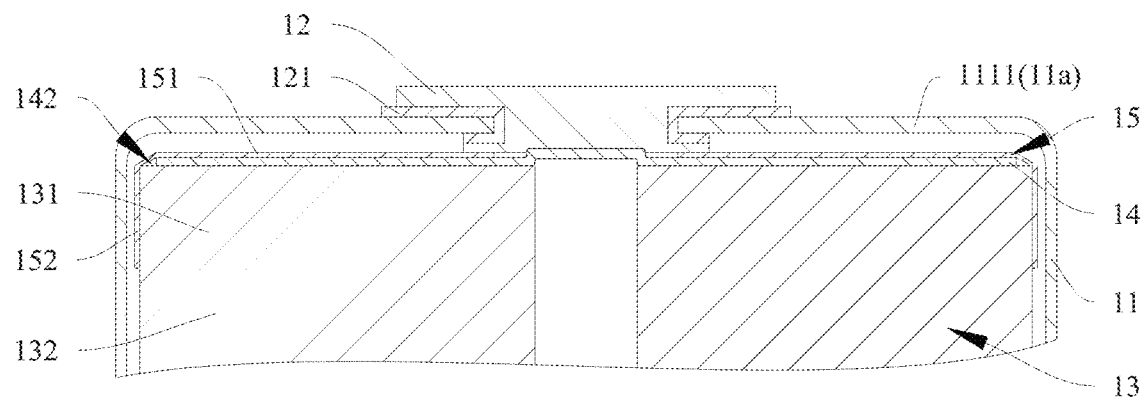
FIG. 6 is a schematic diagram of a heat shrink film including a first portion and a second portion according to an embodiment of this application.

As shown in FIG. 6, FIG. 6 is a schematic diagram of a heat shrink film 15 including a first portion 151 and a second portion 152 according to some embodiments of this application. In some embodiments of this application, the heat shrink film 15 includes a first portion 151 and a second portion 152 that are integrally formed, the first portion 151 covers a side of the current collecting member 14 facing toward the wall portion 11a, and the second portion 152 covers an outer peripheral surface of the first tab 131.

The first tab 131 is electrically connected to the current collecting member 14, and the first tab 131 and the current collecting member 14 have a same polarity, in other words, the first tab 131 and the housing 11 have different polarities. Therefore, the first tab 131 needs to be insulated from the housing 11 to prevent a short circuit caused by electrical connection between the first tab 131 and the housing 11, thereby reducing the risk of short circuits of battery cells 10 and ensuring the high safety of battery cells 10, batteries 100, and electric apparatuses.

As shown in FIG. 6, the current collecting member 14 is disposed between the first tab 131 and the wall portion 11a, to be specific, the current collecting member 14 is disposed on an end surface of the first tab 131 facing toward the wall portion 11a. The end surface of the first tab 131 facing toward the wall portion 11a and the housing 11 are insulated from each other by covering the side of the current collecting member 14 facing toward the wall portion 11a with the first portion 151 of the heat shrink film 15. Further, as shown in FIG. 6, to prevent a short circuit caused by an electrical connection between the outer peripheral surface of the first tab 131 and an inner peripheral wall of the housing 11, the outer peripheral surface of the first tab 131 should also be insulated from the housing 11. Therefore, the heat shrink film 15 is so disposed that it includes the first portion 151 and the second portion 152. In addition to the first portion 151 covering the side of the current collecting member 14 facing toward the wall portion 11a, the outer peripheral surface of the first tab 131 is covered by the second portion 152, so as to insulate the outer peripheral surface of the first tab 131 from the inner peripheral wall of the housing 11.

Specifically, as shown in FIG. 6, in some embodiments of this application, the first portion 151 and the second portion 152 of the heat shrink film 15 are integrally formed. The heat shrink film 15 with the first portion 151 and the second portion 152 integrally formed has a good covering capability so that it can completely cover the side of the current collecting member 14 facing toward the wall portion 11a, the outer peripheral surface of the first tab 131, and corner parts of the current collecting member 14 and the first tab 131. In this way, the current collecting member 14 and the first tab 131 are desirably insulated from the housing 11, and therefore it is unlikely that incomplete coverage of the heat shrink film 15 leads to a short circuit between the current collecting member 14 or the first tab 131 and the housing 11.

As shown in FIG. 6, the corner parts of the current collecting member 14 and the first tab 131 refer to corners of the current collecting member 14 itself, corners of the first tab 131 itself, and corners formed between the current collecting member 14 and the first tab 131. Specifically, the corner of the current collecting member 14 itself is a corner between a side surface of the current collecting member 14 facing toward the wall portion 11a and the outer peripheral surface of the current collecting member 14, the corner of the first tab 131 itself is a corner between a side surface of the first tab 131 facing toward the wall portion 11a and the outer peripheral surface of the first tab 131, and the corner formed between the current collecting member 14 and the first tab 131 is a corner formed between the outer peripheral surface of the current collecting member 14 and the side surface of the first tab 131 facing toward the wall portion 11a.

Further, the heat shrink film 15 with the first portion 151 and the second portion 152 integrally formed is easy to shape and has high production efficiency. In a process of heating the heat shrink film 15, it is not necessary to adjust parts covered by the first portion 151 and the second portion 152. It can be understood that after heated, the heat shrink film 15 integrally formed can, without intervention, naturally and firmly fit onto to cover a part of the battery cell 10 that needs to be covered with the heat shrink film 15. Therefore, the production efficiency of battery cells 10 with the heat shrink film 15 integrally formed is high, and thus the production capacity of batteries 100 is expanded to meet the increasing market demand for the production capacity of batteries 100.

In some other embodiments of this application, the first portion 151 and the second portion 152 of the heat shrink film 15 may alternatively be provided as separate parts. For example, the first portion 151 is a sheet-like ring and covers the side of the current collecting member 14 facing toward the wall portion 11a, and the second portion 152 is a cylinder-like ring and covers the outer peripheral surface of the first tab 131.

In such arrangement, the heat shrink film 15 not only covers the current collecting member 14 but also covers the outer peripheral surface of the first tab 131 so that one heat shrink film 15 insulates and separates the current collecting member 14 from the wall portion 11a and the first tab 131 from a side wall of the housing 11, reducing the number of parts and making battery cells 10 structurally compact.

Figure 7:
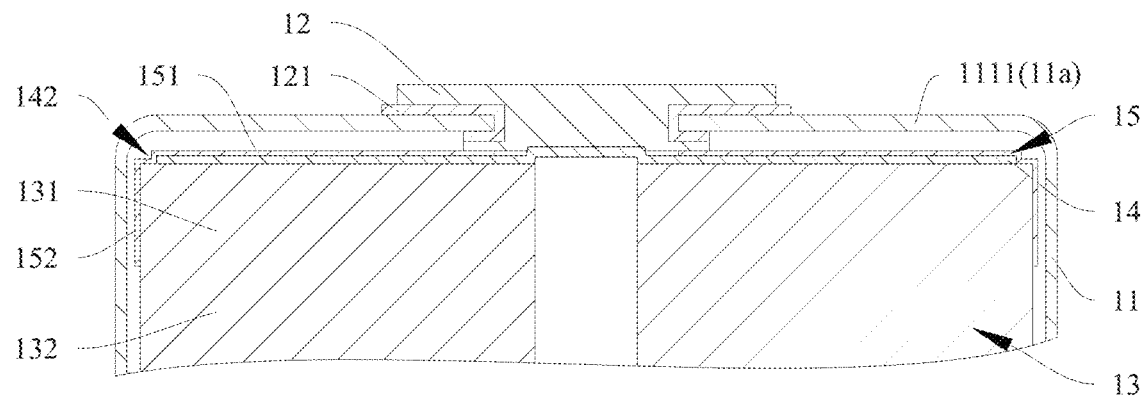
FIG. 7 is another schematic diagram of a heat shrink film including a first portion and a second portion according to an embodiment of this application.

As shown in FIGS. 6 and 7, FIG. 7 is another schematic diagram of a heat shrink film 15 including a first portion 151 and a second portion 152 according to some embodiments of this application. In some embodiments of this application, the current collecting member 14 is disk-shaped, diameter of the current collecting member 14 being smaller than diameter of the first tab 131, a step zone 142 is formed between an edge of the current collecting member 14 and the outer peripheral surface of the first tab 131, and the heat shrink film 15 covers the step zone 142.

The edge of the current collecting member 14 refers to the outer peripheral surface of the current collecting member 14.

As shown in FIGS. 6 and 7, that a step zone 142 is formed between an edge of the current collecting member 14 and the outer peripheral surface of the first tab 131 can be understood as the current collecting member 14 being disposed between the electrode assembly 13 and the wall portion 11a, that is, the current collecting member 14 being disposed between the first tab 131 and the wall portion 11a, in other words, a side surface of the current collecting member 14 facing toward the wall portion 11a is closer to the wall portion 11a than a side surface of the first tab 131 facing toward the wall portion 11a. In addition, the diameter of the current collecting member 14 being smaller than diameter of the first tab 131 means that a projection of the current collecting member 14 on the first tab 131 is located within the first tab 131. In this way, a step-like structure, that is, the step zone 142, is formed between the outer peripheral surface of the current collecting member 14 (the edge of the current collecting member 14) and the outer peripheral surface of the first tab 131.

First, the current collecting member 14 is connected to the first tab 131 through welding, and disposing the step zone 142 provides a sufficient zone between the current collecting member 14 and the first tab 131 for welding, effectively reducing the difficulty of welding between the current collecting member 14 and the first tab 131 and improving the welding efficiency, and thus improving the production efficiency of battery cells 10 to increase the production capacity of batteries 100 so as to meet the market demand for the production capacity of batteries 100.

Second, to ensure that the heat shrink film 15 can completely cover a part of the current collecting member 14 and the first tab 131 that needs to be covered, so that both the current collecting member 14 and the first tab 131 are insulated from the housing 11, the heat shrink film 15 should be provided in sufficient surplus, and the surplus of the heat shrink film 15 is highly susceptible to wrinkling during heat shrinkage of the heat shrink film 15. In addition, the heat shrink film 15 is subject to the flatness of a surface covered with the heat shrink film 15 and the shape of a part covered with the heat shrink film 15 during heat shrinkage. For example, the outer surface of the current collecting member 14 facing toward the wall portion 11a is not absolutely flat but an uneven parting surface, and therefore when the heat shrink film covers the current collecting member 14, the surface of the heat shrink film 15 may wrinkle likewise. Wrinkling may not only affect the quality of the heat shrink film 15 but also may even make it impossible to package the battery cell 10 because a wrinkling part of the heat shrink film 15 gets thicker, leading to failed products and reducing the pass rate of battery cells 10 in production. Therefore, to reduce the wrinkling probability of the heat shrink film 15 during heat shrinkage, a zone for offsetting the surplus of the heat shrink film 15 should be provided at a part to be covered with the heat shrink film 15. The step zone 142 disposed can be configured to offset the surplus of the heat shrink film 15, thereby reducing the wrinkling probability of the heat shrink film 15 during heat shrinkage.

When the heat shrink film 15 covers the current collecting member 14 and the first tab 131, and the step zone 142 is formed between the current collecting member 14 and the first tab 131, in some embodiments of this application, as shown in FIG. 6, the heat shrink film 15 may skip the step zone 142, that is, the heat shrink film 15 fit onto neither the outer peripheral surface of the current collecting member 14 nor the end surface of the first tab 131 facing toward the wall portion 11a. In some other embodiments of this application, as shown in FIG. 7, the heat shrink film 15 may alternatively be shrunken to fit onto the outer peripheral surface of the overlapping current collecting member 14 and the end surface of the first tab 131 facing toward the wall portion 11a.

In such arrangement, the step zone 142 is disposed between the current collecting member 14 and the first tab 131, and disposing the step zone 142 provides sufficient space for welding the current collecting member 14 to the first tab 131, thereby facilitating welding between the current collecting member 14 and the first tab 131, improving the production efficiency of battery cells 10, and increasing the production capacity of batteries 100. In addition, during the heat shrinkage of the heat shrink film 15, the step zone 142 can offset the surplus of the heat shrink film 15, thereby reducing the wrinkling probability of the heat shrink film 15 during shrinkage and improving the flatness in covering the current collecting member 14 with the heat shrink film 15.

Figure 8:
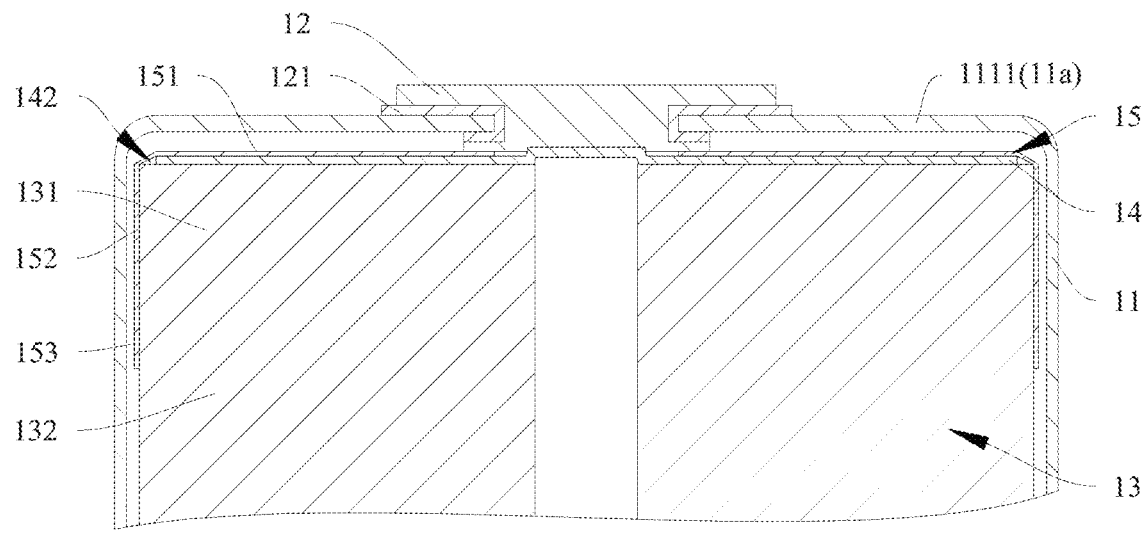
FIG. 8 is a schematic diagram of a heat shrink film including a third portion according to an embodiment of this application.

As shown in FIG. 8, FIG. 8 is a schematic diagram of a heat shrink film 15 including a third portion 153 according to some embodiments of this application. In some embodiments of this application, the heat shrink film 15 further includes a third portion 153, the third portion 153 covering an outer peripheral surface of the body 132, and the third portion 153 and the second portion 152 being integrally formed.

The electrode assembly 13 includes a body 132 and a first tab 131, and the first tab 131 is formed at an end of the body 132 closer to the wall portion 11a. Therefore, in addition to covering the outer peripheral surface of the first tab 131 with the second portion 152, the outer peripheral surface of the body 132 and the inner wall of the housing 11 should also be insulated from each other to prevent a short circuit between the body 132 and the housing 11. Therefore, the heat shrink film 15 is provided with the third portion 153 in a way that the third portion 153 covers the outer peripheral surface of the body 132 so that the body 132 is insulated from the housing 11.

When the third portion 153 and the second portion 152 of the heat shrink film 15 are integrally formed, the second portion 152 and the third portion 153 have good continuity, so that a gap is unlikely to form between the second portion 152 and the third portion 153 during heat shrinkage of the second portion 152 and the third portion 153, ensuring that the second portion 152 and the third portion 153 can completely cover the first tab 131, the body, and a transition zone between the first tab 131 and the body, further reducing the probability of short circuits of battery cells 10, and thus improving the safety of battery cells 10, batteries 100, and electric apparatuses. In addition, because the second portion 152 and the third portion 153 are integrally formed, the second portion 152 and the third portion 153 do not have overlap zones after heat shrinkage, avoiding local thickening of the heat shrink film 15 caused by overlap of the second portion 152 and the third portion 153 while such thickening causes stress concentration at the thickening part of the heat shrink film 15, and thereby reducing the risk of lithium precipitation caused by local stress concentration.

In addition, the third portion 153 and the second portion 152 are integrally formed, and therefore when the third portion 153 fits around the outer peripheral surface of the body, the second portion 152 also fits around the outer peripheral surface of the first tab 131 correspondingly. Afterwards, the heat shrink film 15 is heated, and the second portion 152 and the third portion 153 can be shrunk and correspondingly firmly fit onto the outer peripheral surface of the first tab 131 and the outer peripheral surface of the body to provide coverage. This facilitates the assembly and production of battery cells 10 and allows high production efficiency for battery cells 10.

Further, as shown in FIG. 8, the first portion 151, the second portion 152, and the third portion 153 are sequentially connected and integrally formed to further improve the integrity of the heat shrink film 15. This reduces the risk of short circuits of battery cells 10 and improves the safety performance of battery cells 10; and prevents a joint of the first portion 151 and the second portion 152 and a joint of the second portion 152 and the third portion from overlapping with each other, so that the heat shrink film 15 has a uniform and consistent thickness at all positions and therefore is not prone to stress concentration, thereby reducing the risk of lithium precipitation caused by stress concentration.

In such arrangement, the third portion 153 covers the outer peripheral surface of the body 132, reducing the risk of short circuits between the housing 11 and the body 132, and therefore reducing the risk of short circuits of battery cells 10 and improving the safety of battery cells 10. In addition, the third portion 153 and the second portion 152 are integrally formed and therefore the third portion 153 and the second portion 152 are unlikely to overlap with each other, preventing overlap of the second portion 152 and the third portion 153 from increasing the thickness of the heat shrink film 15, and reducing the probability of local stress concentration caused by the thicker heat shrink film 15 pressing against the housing 11, thereby reducing the risk of lithium precipitation of electrode plates caused by stress concentration.

In some embodiments of this application, the electrode assembly 13 is formed by winding electrode plates and a separator, and the battery cell 10 further includes an adhesive tape, the adhesive tape adhering to the outer peripheral surface of the body 132 and securing a winding tail end of the electrode plate and/or the separator, and the third portion 153 not overlapping with the adhesive tape.

The electrode assembly 13 is formed by winding the electrode plates and the separator, the electrode plates including a positive electrode plate and a negative electrode plate. The positive electrode plate and the negative electrode plate are separated by the separator. Further, portions of the positive electrode plate and the negative electrode plate having an active substance form the body 132, and portions of the positive electrode plate and the negative electrode plate not having an active substance are used to form a positive tab and a negative tab, respectively. For example, the first tab 131 is composed of the part of the positive electrode plate not having an active substance.

Since the electrode assembly 13 is formed by winding the electrode plates and the separator, the electrode plates and the separator tend to expand outward. Therefore, the electrode plates and the separator should be tightened and secured, to prevent the electrode plates and the separator from expanding, and prevent the electrode plates and the separator expanded from coming into direct contact with the housing 11 to result in a short circuit. For example, the adhesive tape may adhere to the outer peripheral surface of the body 132, and the winding tail end of the electrode plates and/or separator is secured by the adhesive tape to prevent the electrode plates and the separator from expanding outward.

The winding tail end is a tail part at an outermost layer of the electrode plates and separator and can also be understood as a winding terminating end of the electrode plates and separator. In addition, when the adhesive tape adheres to the outer peripheral surface of the body 132, the adhesive tape should be insulative to prevent a short circuit between the outermost layer of the electrode plates of the body 132 and the housing 11. For example, the adhesive tape may be a polyvinyl chloride insulation adhesive tape, a polyolefin insulation adhesive tape, or the like.

Further, since the adhesive tape is configured to adhere to the outer peripheral surface of the body 132, and the third portion 153 of the heat shrink film 15 is also configured to cover the outer peripheral surface of the body 132, to prevent stress concentration caused by overlapping of the third portion 153 of the heat shrink film 15 and the adhesive tape, and thus to reduce the risk of lithium precipitation caused by stress concentration, the third portion 153 of the heat shrink film 15 and the adhesive tape should cover different parts of the outer peripheral surface of the body 132, that is, the third portion 153 and the adhesive tape do not overlap.

In such arrangement, no overlapping of the third portion 153 and the adhesive tape prevents a thicker overlap part resulting from overlapping of the third portion 153 and the adhesive tape and therefore makes local stress concentration unlikely, where the local stress concentration is caused by the thicker part pressing against the side wall of the housing 11, thereby reducing the risk of lithium precipitation of electrode plates caused by stress concentration.

It is unlikely to have a thickening problem resulting from overlapping of the third portion 153 and the adhesive tape, and local stress concentration caused by the thickening is prevented, thereby reducing the risk of lithium precipitation of electrode plates caused by stress concentration.

Figure 9:
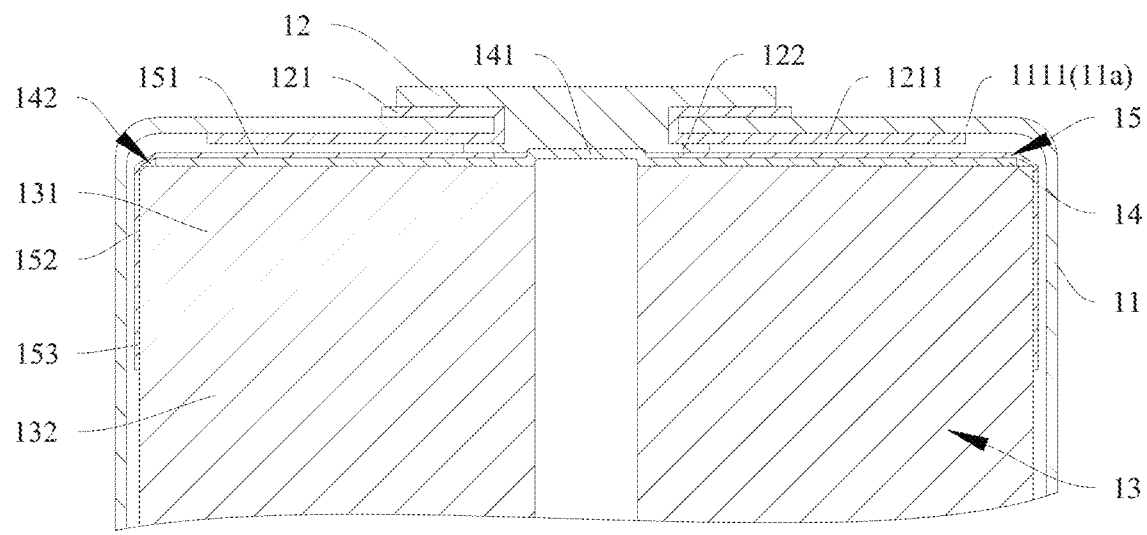
FIG. 9 is a schematic diagram of a battery cell disposed with an elastic layer according to an embodiment of this application.

As shown in FIG. 9, FIG. 9 is a schematic diagram of a battery cell 10 disposed with an elastic layer 1211 according to some embodiments of this application. In some embodiments of this application, the battery cell 10 further includes an elastic layer 1211, the elastic layer 1211 being disposed between the wall portion 11a and the heat shrink film 15, and the elastic layer 1211 being configured to apply an elastic force to the electrode assembly 13 along an axial direction of the electrode assembly 13, that is, to the current collecting member 14 along the axial direction of the electrode assembly 13.

As shown in FIG. 9, in some embodiments of this application, the insulation member 121 is extended between the heat shrink film 15 and the wall portion 11a, and the insulation member 121 extending between the wall portion 11a and the heat shrink film 15 can serve as the elastic layer 1211 of the battery cell 10 and apply an elastic force along the axial direction of the electrode assembly 13 to the electrode assembly 13.

Further, when the insulation member 121 extending between the wall portion 11a and the heat shrink film 15 is used as the elastic layer 1211, the elastic layer 1211 and the heat shrink film 15 may have a sufficient gap between them to prevent a gap between the electrode terminal 12 and the current collecting member 14, thereby ensuring that the electrode terminal 12 and the current collecting member 14 can firmly abut against and be electrically connected to each other.

Certainly, on the basis of ensuring that the electrode terminal 12 and the current collecting member 14 can be stably electrically connected, the elastic layer 1211 may alternatively abut against the heat shrink film 15 to further restrain the electrode assembly 13, thereby reducing the probability of the electrode assembly 13 moving along the axial direction thereof. In this case, to enable the elastic layer 1211 to abut against the heat shrink film 15, a protrusion facing toward the heat shrink film 15 may be formed on a part of the insulation member 121 extending between the wall portion 11a and the heat shrink film 15, that is, a part of the insulation member 121 serving as the elastic layer 1211, so that the elastic layer 1211 abuts against the heat shrink film through the protrusion. Specifically, the protrusion may be in a form of ring, or multiple protrusions may be present, the multiple protrusions being spaced apart along an axis of the electrode assembly 13.

It should be noted that when the part of the insulation member 121 extending between the wall portion 11a and the heat shrink film 15 is used as the elastic layer 1211, the insulation member 121 should be elastic enough. In this case, the insulation member 121 may be made of rubber such as butyl rubber, styrene-butadiene rubber, or silicone rubber.

In some other embodiments of this application, the elastic layer 1211 may alternatively be a separate part of the battery cell 10. In this case, two ends of the elastic layer 1211 along the axial direction of the electrode assembly 13 abut against the wall portion 11a and the heat shrink film 15 respectively, to restrain the electrode assembly 13 so as to reduce the probability of the electrode assembly 13 moving along the axial direction thereof.

In such arrangement, when the battery cell 10 is subjected to vibration, the elastic layer 1211 can apply an elastic force to the electrode assembly 13 and the current collecting member 14 along the axial direction thereof, further insulating and separating the current collecting member 14 from the wall portion 11a, reducing the risk of short circuits of battery cells 10, and improving the safety of battery cells 10.

Figure 10:
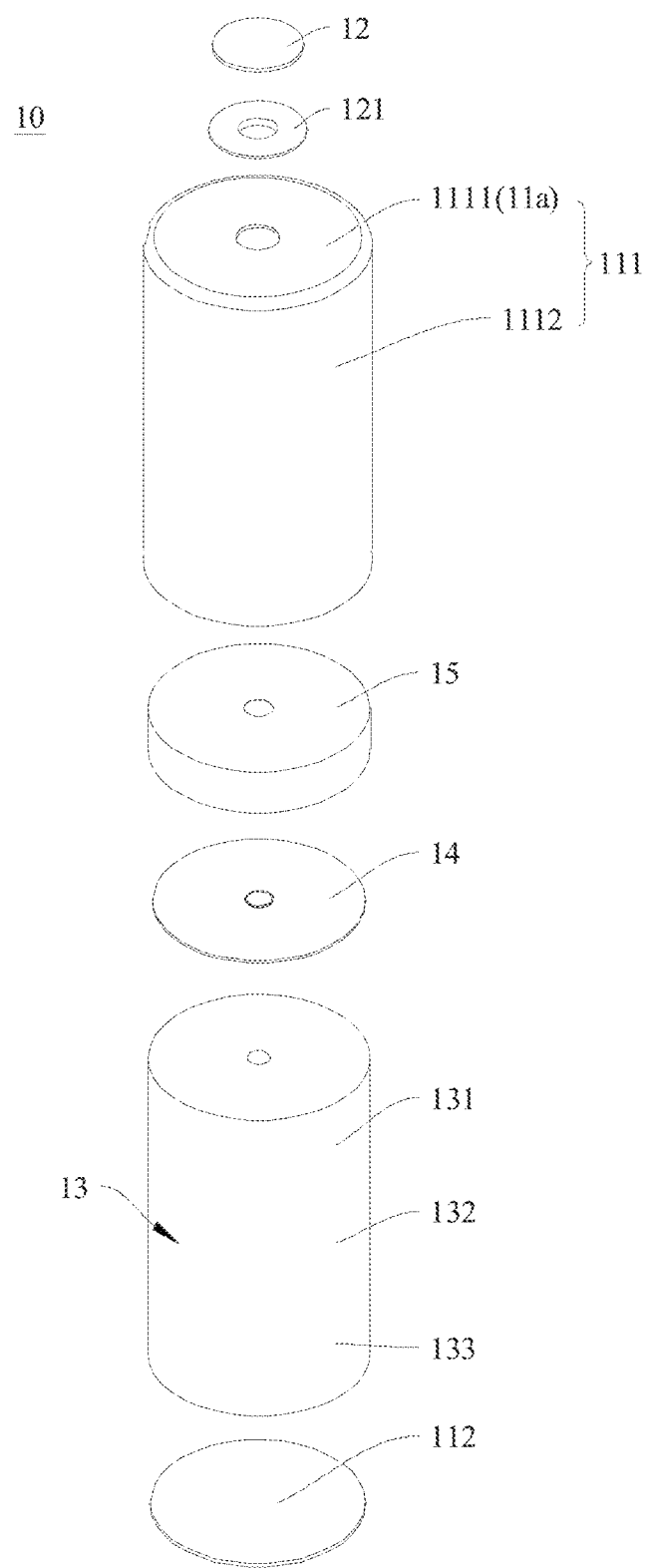
FIG. 10 is a schematic diagram of a battery cell according to an embodiment of this application.

As shown in FIG. 10, FIG. 10 is a schematic diagram of a battery cell 10 according to some embodiments of this application. In some embodiments of this application, the electrode assembly 13 further includes a second tab 133, the second tab 133 being formed at an end of the body 132 farther away from the wall portion 11a, the second tab 133 and the first tab 131 having opposite polarities, and the second tab 133 being electrically connected to the wall portion 11a.

As shown in FIG. 10, the first tab 131 is located at an end of the electrode assembly 13 facing toward the wall portion 11a, and the second tab 133 is located at an end of the electrode assembly 13 farther away from the wall portion 11a, that is, the first tab 131 and the second tab 133 are formed at two ends of the body 132 of the electrode assembly 13, respectively.

The first tab 131 and the second tab 133 have opposite polarities. For example, the first tab 131 is a positive tab of the electrode assembly 13, composed of a part of the positive electrode plate having no active substance, and electrically connected to the current collecting member 14 and the electrode terminal 12. The second tab 133 is a negative tab of the electrode assembly 13, composed of a part of the negative electrode plate having mo active substance, and electrically connected to the housing 11.

In such arrangement, the first tab 131 and the second tab 133 are located at two ends of the electrode assembly 13, allowing desirable insulation between the first tab 131 and the second tab 133, thereby reducing the risk of short circuits of battery cells 10 and improving the safety of battery cells 10.

As shown in FIG. 10, in some embodiments of this application, the housing 11 includes a housing body 111 and an end cover 112, the housing body 111 including a bottom wall 1111 and a side wall 1112, the side wall 1112 surround the bottom wall 1111, one end of the side wall 1112 being connected to the bottom wall 1111, the other end of the side wall 1112 enclosing an opening opposite the bottom wall 1111, the end cover 112 covering the opening, and the wall portion 11a being the bottom wall 1111 or the end cover 112.

The bottom wall 1111 and the side wall 1112 may be integrally formed or the bottom wall 1111 and the side wall 1112 may alternatively be disposed as separate parts and connected by welding, snap-fit, or the like. Specifically, the side wall 1112 may be columnar, such as cylindrical or prismatic.

The other end of the side wall 1112 opposite the bottom wall 1111 encloses the opening, and the current collecting member 14 and the electrode assembly 13 can be mounted into the housing body 111 through the opening. After the electrode assembly 13 is mounted into the housing body 111, the opening is covered by the end cover 112 to close the opening. Further, the housing 11 needs to be filled with an electrolyte. When the end cover 112 covers the opening, a sealing member such as a sealing ring or gasket may be disposed between the end cover 112 and the side wall 1112 to allow the end cover 16 to more hermetically cover the opening, thereby preventing the electrolyte from leaking out of the housing 11.

The wall portion 11a is the bottom wall 1111 or the end cover 112, and in some embodiments of this application, the current collecting member 14 faces toward the bottom wall 1111 after the electrode assembly 13 is mounted into the housing body 111. In this case, the bottom wall 1111 is the wall portion 11a and the first insulation member 15 is disposed between the bottom wall 1111 and the current collecting member 14. In some other embodiments of this application, after the electrode assembly 13 is mounted into the housing body 111, the current collecting member 14 faces toward the end cover 112. In this case, the end cover 112 is the wall portion 11a and the first insulation member 15 is disposed between the end cover 112 and the current collecting member 14.

In such arrangement, the side wall 1112 and the wall portion 11a define a space to accommodate the electrode assembly 13, the electrolyte, and other structures, and the end cover 16 covers the opening enclosed by the side wall 1112 to ensure airtightness of the housing.

According to a second aspect, this application further provides a battery 100 including the foregoing battery cell 10. Since the current collecting member 14 and the wall portion 11a are insulated from each other by the heat shrink film 15 in the battery cell 10, a short circuit between the current collecting member 14 and the wall portion 11a is prevented, thereby reducing the probability of short circuits of battery cells 10 and thus improving the safety of batteries 100.

According to a third aspect, this application further provides an electric apparatus including the foregoing battery 100, where the battery 100 is configured to supply electrical energy to allow the electric apparatus to work.

Figure 11:
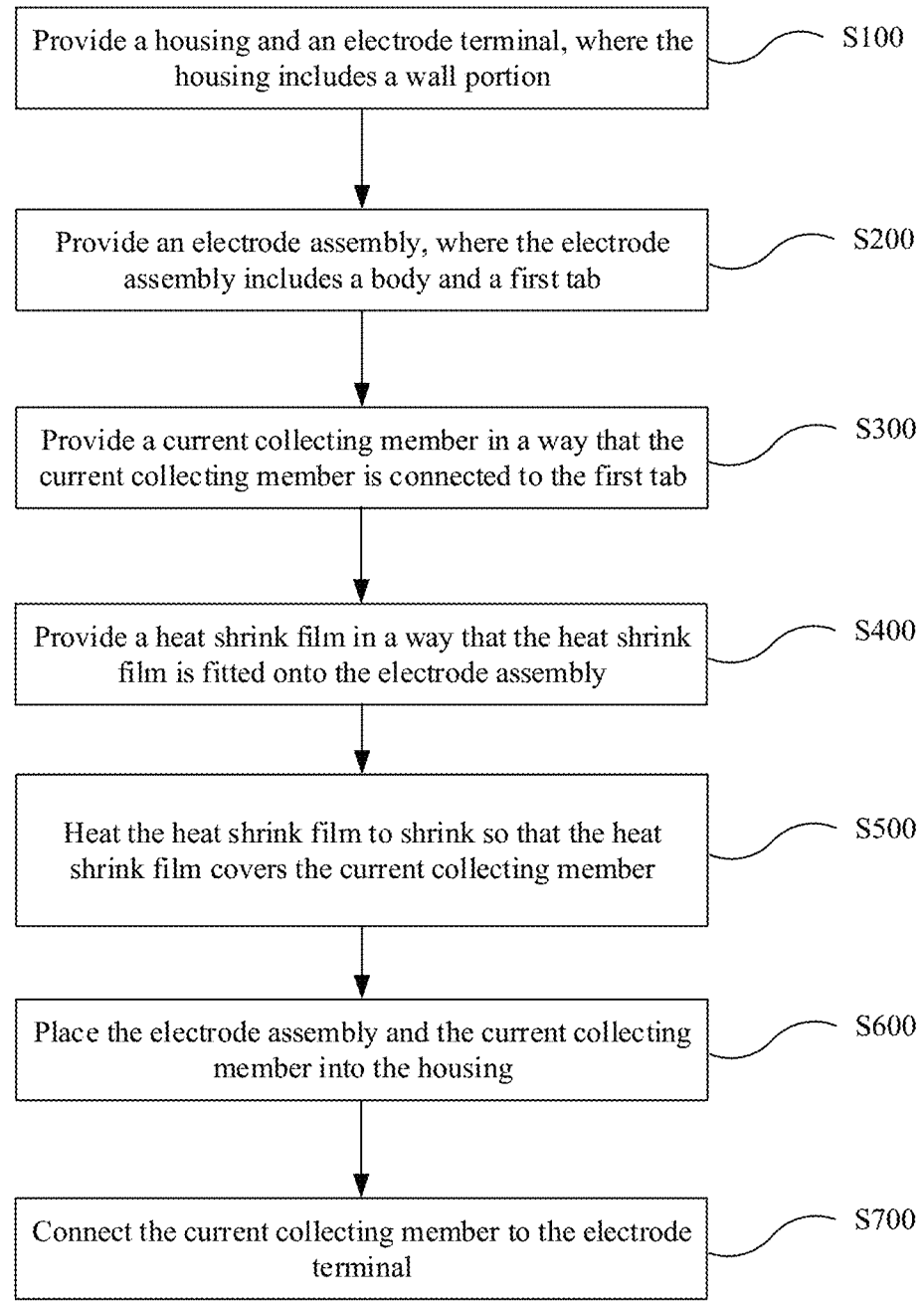
FIG. 11 is a schematic diagram of a manufacturing method for battery cell according to Embodiment 4 of this application.

According to a fourth aspect, as shown in FIG. 11, FIG. 11 is a schematic diagram of a manufacturing method for battery cell according to some embodiments of this application. This application further provides a manufacturing method for battery cell. Specifically, the manufacturing method for battery cell is as follows:

S100. Provide a housing 11 and an electrode terminal 12, where the housing 11 includes a wall portion 11a, and the electrode terminal 12 is insulatively mounted on the wall portion 11a.

S200. Provide an electrode assembly 13, where the electrode assembly 13 includes a body 132 and a first tab 131, and the first tab 131 is formed at an end of the body 132 closer to the wall portion 11a.

S300. Provide a current collecting member 14 in a way that the current collecting member 14 is connected to the first tab 131.

S400. Provide a heat shrink film 15 in a way that the heat shrink film 15 is fitted onto the electrode assembly 13.

S500. Heat the heat shrink film 15 to shrink so that at least a part of the heat shrink film 15 covers the current collecting member 14.

S600. Place the electrode assembly 13 and the current collecting member 14 covered with the heat shrink film 15 into the housing 11, with a side of the current collecting member 14 covered with the heat shrink film 15 facing toward the wall portion 11a to insulate the current collecting member 14 from the wall portion 11a.

S700. Connect the current collecting member 14 to the electrode terminal 12.

It should be noted that the above manufacturing method for battery cell is only intended to provide an example of manufacturing of the battery cell 10 and does not indicate a specific sequence in manufacturing of the battery cell 10.

Figure 12:
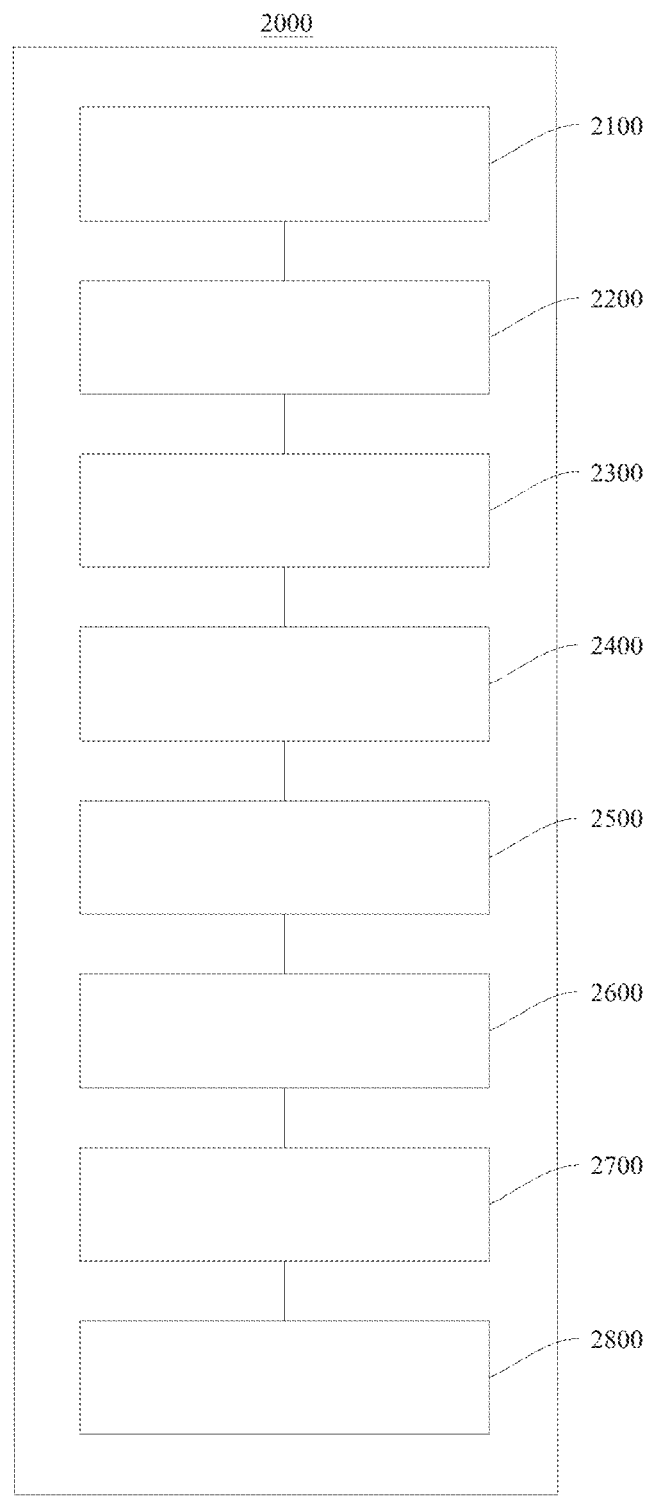
FIG. 12 is a schematic diagram of a manufacturing device for battery cell according to Embodiment 5 of this application.

According to a fifth aspect, as shown in FIG. 12, FIG. 12 is a schematic diagram of a manufacturing device 2000 for battery cell according to some embodiments of this application. This application further provides a manufacturing device 2000 for battery cell configured to manufacture the foregoing battery cell 10. The manufacturing device 2000 for battery cell includes a first providing means 2100, a second providing means 2200, a third providing means 2300, a fourth providing means 2400, a first assembly means 2500, a heating means 2600, a second assembly means 2700, and a third assembly means 2800.

Specifically, as shown in FIG. 12, the first providing means 2100 is configured to provide a housing 11 and an electrode terminal 12, where the housing 11 includes a wall portion 11a, and the electrode terminal 12 is insulatively mounted on the wall portion 11a. The second providing means 2200 is configured to provide an electrode assembly 13, where the electrode assembly 13 includes a body 132 and a first tab 131, and the first tab 131 is formed at an end of the body 132 closer to the wall portion 11a. The third providing means 2300 is configured to provide a current collecting member 14. The fourth providing means 2400 is configured to provide a heat shrink film 15 in a way that the heat shrink film 15 is fitted onto the electrode assembly 13. The first assembly means 2500 is configured to connect the current collecting member 14 to the first tab 131. The heating means 2600 is configured to heat the heat shrink film 15 to shrink so that at least a part of the heat shrink film 15 covers the current collecting member 14. The second assembly means 2700 is configured to place the electrode assembly 13 and the current collecting member 14 covered with the heat shrink film 15 into the housing 11, with a side of the current collecting member 14 covered with the heat shrink film 15 facing toward the wall portion 11a to insulate the current collecting member 14 from the wall portion 11a. The third assembly means 2800 is configured to connect the current collecting member 14 to the electrode terminal 12.

In some embodiments of this application, as shown in FIGS. 3 to 10, this application provides a battery cell 10 including a housing 11, an electrode terminal 12, an electrode assembly 13, a current collecting member 14, and a heat shrink film 15. The housing 11 includes a wall portion 11a and a side wall 1112, and an insulation member 121 is disposed between the electrode terminal 12 and the wall portion 11a so that the electrode terminal 12 is insulatively mounted on the wall portion 11a. The electrode assembly 13 is disposed in the housing 11, and the electrode assembly 13 includes a first tab 131, a body 132, and a second tab 133, the first tab 131 being electrically connected to the current collecting member 14, and the second tab 133 being electrically connected to the housing 11. The current collecting member 14 is disposed between the electrode assembly 13 and the wall portion 11a, the current collecting member 14 is configured to connect the first tab 131 and the electrode terminal 12, and a part of the current collecting member 14 connected to the electrode terminal 12 is formed with a first protruding portion 141 to facilitate electrical connection between the current collecting member 14 and the electrode terminal 12. The heat shrink film 15 includes a first portion 151, a second portion 152, and a third portion 153 that are integrally formed and sequentially connected, with the first portion 151 covering a side of the current collecting member 14 facing toward the wall portion 11a, the second portion 152 covering an outer peripheral surface of the first tab 131, and the third portion 153 covering an outer peripheral surface of the body 132, so that the current collecting member 14, the first tab 131, and the body 132 are insulated from the housing 11. Diameter of the current collecting member 14 is smaller than diameter of the first tab 131, and a step zone 142 is formed between the current collecting member 14 and the first tab 131. The step zone 142 is configured to offset a surplus during shrinkage of the heat shrink film 15. A part of the insulation member 121 extending between the wall portion 11a and the heat shrink film 15 serves as an elastic layer 1211. The elastic layer 1211 is configured to apply an elastic force to the electrode assembly 13 along an axial direction of the electrode assembly 13. An end of the side wall 1112 farther away from the wall portion 11a encloses an opening, and an end cover 16 is configured to cover the opening.

Although this application has been described with reference to some preferred embodiments, various modifications to this application and replacements of the components therein with equivalents can be made without departing from the scope of this application. In particular, as long as there is no structural conflict, the various technical features mentioned in the embodiments can be combined in any manner. This application is not limited to the specific embodiments disclosed in this specification but includes all technical solutions falling within the scope of the claims.

The invention claimed is:

1. A battery cell, comprising:
a housing comprising a wall portion;
an electrode terminal insulatively mounted on the wall portion;
an electrode assembly disposed in the housing, wherein the electrode assembly comprises a body and a first tab, and the first tab is formed at an end of the body closer to the wall portion;
a current collector disposed between the electrode assembly and the wall portion to connect the first tab and the electrode terminal; and
a heat shrink film, wherein at least a part of the heat shrink film covers a side of the current collector facing toward the wall portion to insulate the current collector from the wall portion, wherein
a part of the heat shrink film extends between the electrode terminal and the current collector so that the heat shrink film is clamped and compressed by the electrode terminal and the current collector.

2. The battery cell according to claim 1, wherein a gap is present between the heat shrink film and the wall portion.

3. The battery cell according to claim 1, wherein the heat shrink film comprises a first portion and a second portion that are integrally formed, the first portion covers the side of the current collector facing toward the wall portion, and the second portion covers an outer peripheral surface of the first tab.

4. The battery cell according to claim 3, wherein the current collector is disk-shaped, a diameter of the current collector being smaller than a diameter of the first tab, a step zone is formed between an edge of the current collector and the outer peripheral surface of the first tab, and the heat shrink film covers the step zone.

5. The battery cell according to claim 3, wherein the heat shrink film further comprises a third portion, the third portion covering an outer peripheral surface of the body, and the third portion and the second portion being integrally formed.

6. The battery cell according to claim 5, wherein the electrode assembly is formed by winding electrode plates and a separator, and the battery cell further comprises an adhesive tape, the adhesive tape adhering to the outer peripheral surface of the body and securing a winding tail end of the electrode plate and/or the separator, and the third portion not overlapping with the adhesive tape.

7. The battery cell according to claim 1, wherein the battery cell further comprises an elastic layer, the elastic layer being disposed between the wall portion and the heat shrink film, and the elastic layer being configured to apply an elastic force to the electrode assembly along an axial direction of the electrode assembly.

8. The battery cell according to claim 1, wherein the electrode assembly further comprises a second tab, the second tab being formed at an end of the body farther away from the wall portion, the second tab and the first tab having opposite polarities, and the second tab being electrically connected to the housing.

9. The battery cell according to claim 1, wherein the housing comprises a housing body and an end cover, the housing body comprising a bottom wall and a side wall, the side wall surrounding the bottom wall, one end of the side wall being connected to the bottom wall, the other end of the side wall enclosing an opening opposite the bottom wall, the end cover covering the opening, and the wall portion being the bottom wall or the end cover.

10. A battery, comprising the battery cell according to claim 1.

11. An electric apparatus, comprising the battery according to claim 10, wherein the battery is configured to supply electrical energy.

12. A manufacturing method for battery cell, comprising:
providing a housing and an electrode terminal, wherein the housing comprises a wall portion, and the electrode terminal is insulatively mounted on the wall portion;
providing an electrode assembly, wherein the electrode assembly comprises a body and a first tab, and the first tab is formed at an end of the body closer to the wall portion;

providing a current collector in a way that the current collector is connected to the first tab;
providing a heat shrink film in a way that the heat shrink film is fitted onto the electrode assembly;
heating the heat shrink film to shrink so that at least a part of the heat shrink film covers the current collector;
placing the electrode assembly and the current collector covered with the heat shrink film into the housing, with a side of the current collector covered with the heat shrink film facing toward the wall portion to insulate the current collector from the wall portion; and
connecting the current collector to the electrode terminal, wherein
a part of the heat shrink film extends between the electrode terminal and the current collector so that the heat shrink film is clamped and compressed by the electrode terminal and the current collector.

\* \* \* \* \*